United States Patent [19]

Abraham

[11] Patent Number: 4,521,806
[45] Date of Patent: Jun. 4, 1985

[54] RECORDED PROGRAM COMMUNICATION SYSTEM

[75] Inventor: Nicholas F. Abraham, Cape Coral, Fla.

[73] Assignee: World Video Library, Inc., Fort Worth, Tex.

[21] Appl. No.: 409,566

[22] Filed: Aug. 19, 1982

[51] Int. Cl.³ .............................................. H04M 7/18
[52] U.S. Cl. ...................................... 358/86; 358/146
[58] Field of Search .................... 358/85, 86, 142, 141, 358/114, 116, 146; 455/5

[56] References Cited

U.S. PATENT DOCUMENTS

| | | | |
|---|---|---|---|
| 4,122,299 | 10/1978 | Cannon | 358/141 |
| 4,381,522 | 4/1983 | Lambert | 358/86 |
| 4,400,717 | 8/1983 | Southworth et al. | 358/141 |

Primary Examiner—John C. Martin
Assistant Examiner—Edward L. Coles
Attorney, Agent, or Firm—Jacob Shuster

[57] ABSTRACT

A plurality of recorded audio/video signal sources of a program library sequentially transmit segments of a broadcast signal within a time compressed transmission period through a common signal carrier path to a plurality of subscriber stations at which selected segments are detected and expanded for real time reproduction through standard television receivers. Program selection is effected at the subscriber stations through telephone dialing codes also transmitted to the service station by standard telephone communication producing insertion of message information in the broadcast signal during spacing intervals between the sequential segments thereof.

5 Claims, 5 Drawing Figures

RECORDED PROGRAM COMMUNICATION SYSTEM

BACKGROUND OF THE INVENTION

This invention relates to a method of generating and processing audio/video broadcast signals in a subscription communication system of the type disclosed in my prior copending application, Ser. No. 383,604, filed June 1, 1982, now pending with respect to which the present invention is a continuation-in-part.

According to the disclosure in my prior copending application, a subscription service station has a program library formed by a plurality of recorded audio/video signal sources from which selected program material is broadcast through signal carrier cable or the like to subscriber stations in response to dialing code selection signals transmitted by standard telephone communication. Transmission from a selected recorded program source in the library is delayed to establish a preceding message period during which program identification and other information is broadcast to the subscriber station.

Various multiplexing methods were contemplated in connection with the foregoing communication system for servicing a sufficient number of subscriber stations to make the system economically feasible. It is however an important object of the present invention to provide a method of processing the program signals in such as manner as to further increase the number of subscribers capable of being serviced and to permit enlargement of the program content of the library from which selections may be made.

Other objects consistent with the foregoing object are to enhance security against unauthorized use of the subscription communication system without drastic modification of the standard television receiver at the subscriber stations.

SUMMARY OF THE INVENTION

In accordance with the present invention a plurality of recorded audio/video programs of a storage library are readout in sequence as segments of a broadcast signal during repeated transmission periods that are time compressed for broadcast through a leased cable communication path, for example, to the subscriber stations. The library readout signals are encoded by being digitized and processed through a signal time compression type of multiplexer. At each subscriber station, a selected program segment of the broadcast signal is detected, and decoded by being time expanded and then converted into analog form for reproduction through standard circuits of a television receiver. Program signal segment selection is effected through local sonic transmission of a selection code periodically published in a directory distributed by the subscription service company to subscribers. The selection code forms part of the dialing code inputted to a conventional telephone instrument by a subscriber to establish a telephone link with the remote service station at which the storage library is located.

The selection code is operative at the head end service station to activate a selected one of a plurality of changeable message signal sources corresponding to the selected program segment. The message signal from the activated signal source is inserted into the aforementioned time compressed broadcast signal during spacing intervals between the program segments. The simultaneous occurrence of the same selection code in the dialing signal received at the service station and in the output broadcast signal at the end of a selected message interval triggers delayed operation of a billing computer by the subscriber identification portion of the dialing code.

The broadcast signal is digitized and time compressed so as to enlarge the subscription audience handling capability of the system. Time compression multiplexing of video signals as a function of the number of signal sources is generally known as disclosed, for example, in U.S. Pat. No. 4,300,161 to Haskell. However, in accordance with the present invention, the time delays introduced during the signal processing operation of such multiplexer are utilized to establish the spacing intervals between program segments into which selected message signals are inserted.

Time expansion of the compressed signal segment detected at the subscriber station is accomplished through a two speed recorder/player device of the type disclosed, for example, in U.S. Pat. No. 2,987,614 to Robert et al. A light wave recording disc is however utilized as the eraseable recording medium to enable use of a sufficiently high recording speed and to enlarge its recording content for the particular purposes of the present invention.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
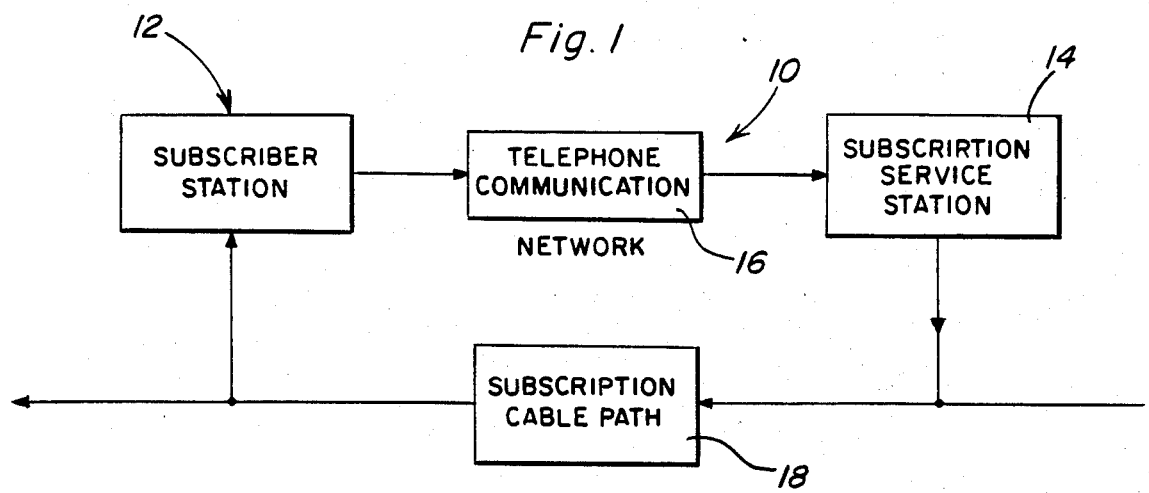
FIG. 1 is a simplified block diagram illustrating the communication system of the present invention.

Referring now to the drawings in detail, FIG. 1 diagrammatically illustrates the general arrangement of a communication system referred to by reference numeral 10 with which the present invention is associated. One of a plurality of subscriber stations 12 are shown linked with a common service station 14 through an existing telephone communication network 16. Video/audio program material stored at the service station 14 is transmitted to the subscriber stations through a subscription cable path 18 or other equivalent communication path which is independent of the telephone communication network. Generally, the system operates in response to coded telephone signals dialed at any one of the subscriber stations to establish a telephone link with the service station 14 and select program material in its library for broadcast through the communication path 18 to the subscriber station from which such selection signal originates. When a selected program is transmitted to a station 12 through the communication path 18 in response to a dialed signal, an identification code in the dialed signal registers such transmission for billing purposes. The foregoing arrangement and operation of the system 10 is generally similar to that disclosed in my prior co-pending application, aforementioned.

Figure 2:
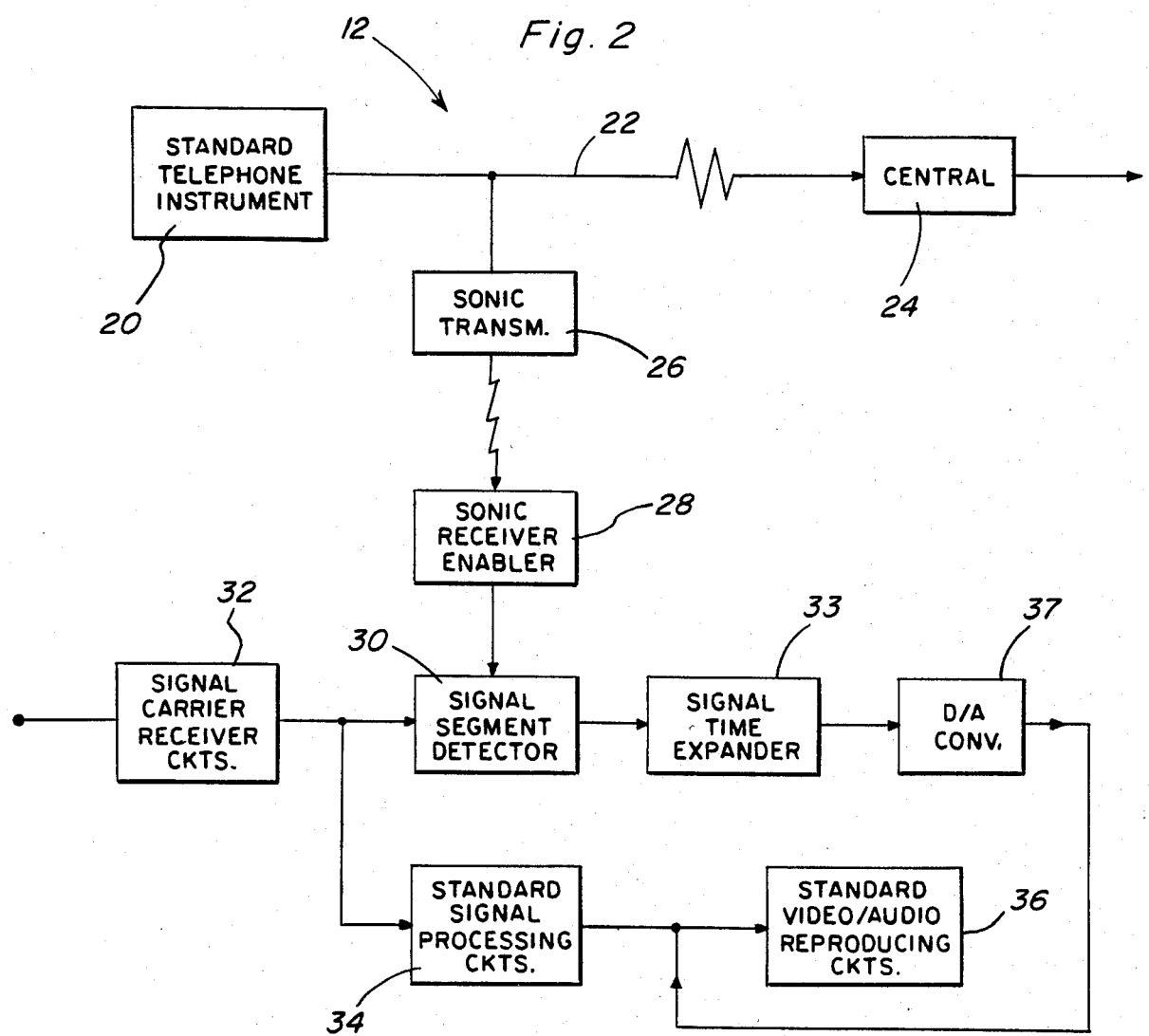
FIG. 2 is a block diagram illustrating in greater detail the system at a subscriber station.

In accordance with the present invention, each subscriber station 12 includes a standard telephone instrument 20 as diagrammed in FIG. 2 from which dialed signals are transmitted by the usual telephone lines 22 to a central telephone utility exchange 24 through which the telephone links are established to receiving stations including the service station 14 aforementioned. In addition to the usual station dialing code transmitted by lines 22 for establishing the telephone link with service station 14, the telephone dialed signal will include an identification code corresponding to the particular subscriber station and a program selection code. The presence of any program selection code will trigger operation of sonic transmitter 26 the output of which is received by a sonic receiving enabler component 28. The component 28 enables a broadcast segment detector 30 thereby rendered operative to detect the selected code in the program signal and extract a segment of a continuous broadcast signal received through the subscription cable path 18 by the signal carrier receiver circuits 32 at the subscriber station. The signal carrier receiver circuits from part of a standard television receiver including the standard signal processing circuits 34 and the standard video/audio reproducing circuits 36. Certain channels set aside for transmission of subscription programs will however be processed by the detector 30 as aforementioned and fed to a signal time expander 32. The signal time expander is operative to convert continuous program information that is in a time compressed digital form into real time digital information fed to a digital-to-analog convertor 37. Thus, the components 30, 32, and 37 added to the standard television receiver are operative to process subscription program information selected for reproduction through the standard television receiver with a high degree of unauthorized use security.

Figure 3:
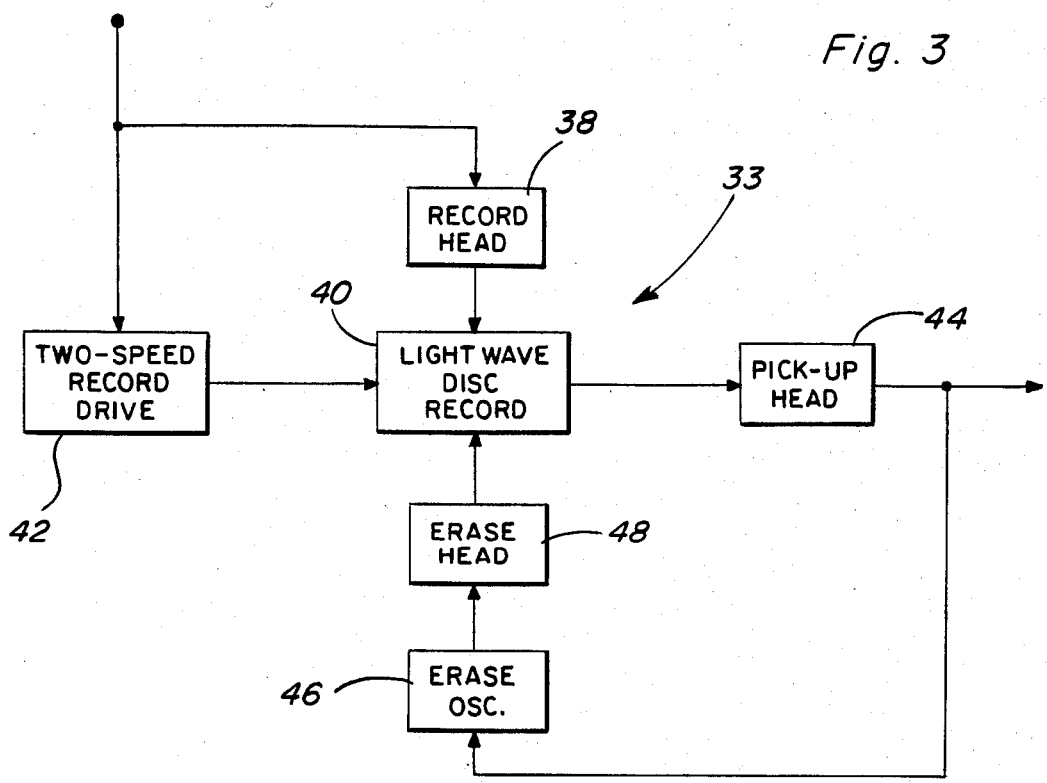
FIG. 3 is a simplified circuit diagram of the signal time expander associated with the system at each subscriber station.

According to one embodiment of the invention as illustrated in FIG. 3, the signal time expanding operation of component 32 is accomplished by recording the input signal from component 30 by means of a record head 38 on a light wave type of recording disc 40. In response to such input signal, a two-speed record drive 42 is conditioned for effecting a recording operation at a relatively high recording speed corresponding to the signal time compression associated with the incoming signal as will be explained hereinafter. Thus, a continuous program signal is recorded during a segment of a time compressed transmission period on the record medium 40. At the end of such recording operation, a coded portion of the incoming signal is operative to switch operation of the record drive 42 to the playback mode. In the playback mode, the record drive will advance the record medium in the opposite direction at a relatively low speed for signal pickup by the head 44 in real time. The output signal from the pick up head 44 will be operative through an eraser oscillator 46 and an eraser head 48 to erase the recorded signal on the record medium 40 so that it will be available for subsequent recording of incoming signals.

Figure 4:
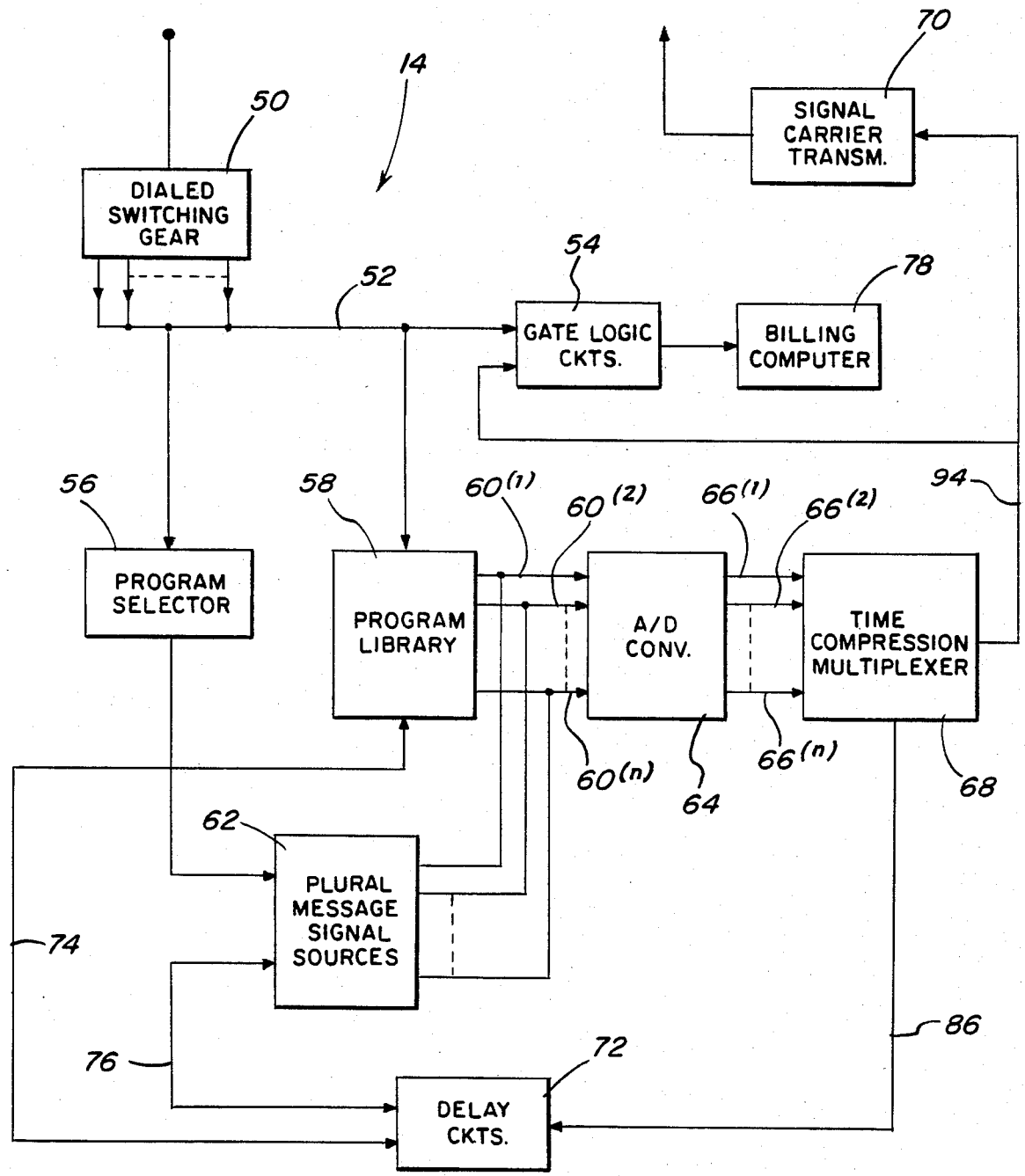
FIG. 4 is a block diagram illustrating in greater detail the system at the service station.

The telephone dialed signal originating from one or more subscriber stations is received at the service station 14 diagrammed in greater detail in FIG. 4. Such dialed signals are received at a dial switching gear 50, one at a time, through use of a busy signal generating arrangement well known in the art. Each dialed signal will thus be transmitted with its selection and identification code to an output code line 52. The identification and selection codes in the output line 52 are applied to a gate logic circuit component 54, a program selector component 56 and to a program library 58. The program library includes a plurality of signal sources in the form of continuous recorded video/audio programs respectively having a real time signal duration of ½ hour to two hours, for example. In response to reception of any signal input, the program library will be triggered into repeated readout operation wherein each of the signal sources sequentially delivers segments of the total program material stored. At the same time, the signal selection code operates the program selector 56 so as to activate a selected one of a plurality of message signal sources 62 having outputs interconnected with corresponding signal segment outputs 60(1), 60(2)–60(n) of the program library. The signal outputs of the program library 58 and message signal sources 62 being in analog form, are fed to an analog-to-digital converter 64 so as to deliver digital outputs in lines 66(1), 66(2)–66(n) to a time compression multiplexer 68. Thus, the video/audio information content of the signal sources in program library 58 and message signal sources 62 are digitized and compressed time-wise for transmission through line 94 to a signal carrier transmitter 70 during time compressed transmission periods of relatively short duration as compared to the real time duration. The signal time compressed output is transmitted by the transmitter 70 to the subscriber stations through the subscription communication path 18 as aforementioned.

The message and code information of the plurality of message signal sources 62 are inserted during program spacing intervals between the signal segment readout from the program library 58. Toward that end, a delay circuit component 72 is provided synchronized with operation of the multiplexer 68 by control line 86. A delay signal line 74 from the delay circuits 72 controls readout operation of the program library in order to establish the program spacing intervals into which the outputs of signal sources 62 are inserted under control of the delay circuits through line 76. Output line 94 from the multiplexer 68 also provides an input to the gate logic circuits 54 at the end of a program spacing interval so as to establish a signal conducting path for the identification code supplied thereto by output line 52. When enabled by the signal output, the gate logic circuits will register the transmission of the following signal segment by triggering operation of the billing computer 78 in response to matching codes in output lines 52 and 94. Accordingly, each subscriber may be billed for each program selection made. Further, the gate logic circuits 54 will be operable to cancel registration of any program selection and subscriber billing operation if another telephone dialed signal is received during the program spacing interval. It is during such program spacing intervals that a message corresponding to the selected signal segment is inserted to identify the forthcoming program in order to provide the subscriber an opportunity to cancel as well as to provide an opportunity for sponsors to broadcast commercials as noted in my prior copending application aforementioned.

In accordance with one embodiment of the invention, the time compression multiplexer 68 may be of the type disclosed in U.S. Pat. No. 4,300,161 aforementioned. However, in accordance with the present invention, delay synchronizing signals are fed therefrom to the delay circuits 72 through signal line 86 for establishing the program spacing intervals between signal segments and synchronizing the insertion of selected message information.

Figure 5:
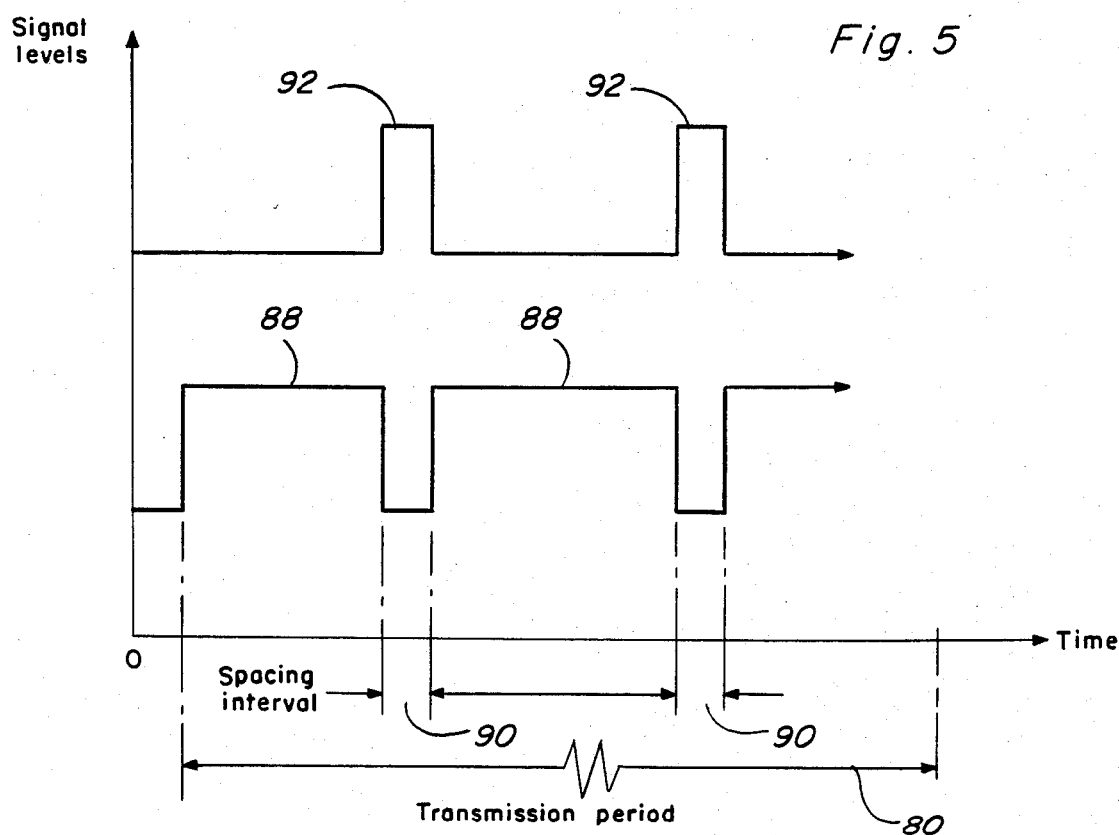
FIG. 5 is a graphical illustration depicting certain operational characteristics of the system.

Operation of the delay circuits 72 in controlling the timing of the outputs from the program library 58 and message signal sources 62 is graphically illustrated in FIG. 5. As shown, the program segments sequentially readout from the program library during each transmission period 80, are represented by reference numeral 88. These program segments are separated by spacing intervals 90. For each subscriber station linked to the service station during a timed compressed transmission period 80, a selected message signal 92 will be broadcast during one of the spacing intervals preceding the selected program segment detected at the subscriber station as hereinbefore described.

According to one embodiment of the invention, the entire content of one program library will be readout during repeated transmission periods that are time compressed to reduce the waiting time for reception of a selected program by a wider audience as well as to provide unauthorized use security. Thus, the waiting time will usually be less than the duration of a time compressed transmission period since an incoming selection signal at the service station will often occur before the desired program segment selected is broadcast. The waiting time will be further reduced by insertion of the message signal corresponding to the selected program segment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a communication system through which a plurality of subscriber stations are linked by telephone network with a common service station at which a plurality of video/audio signal sources are located for transmission of continuous program information, in response to telephone dialed selection signals to the subscriber stations through a common signal carrier path independent of the telephone network, a signal transmission method including the steps of: processing the information sequentially readout at the service station for broadcast during predetermined transmission periods; detecting time-spaced segments of the broadcast program information at each of the subscriber stations corresponding to the selection signals originating therefrom; and sequentially decoding the detected segments of the broadcast program information for real time reproduction thereof at the subscriber stations, including the steps of: storing additional information at the service station corresponding to the segments of the broadcast program information; selecting the additional information in response to reception of said selection signals; inserting the selected additional information during program spacing intervals between the segments of the broadcast program information for broadcast to the subscriber stations in advance of said segments of the broadcast information, registering said selection of the additional information following the program spacing intervals during broadcast of the segments of the program information; and cancelling said registration of previously selected additional information in response to telephoned signals received prior to termination of the spacing intervals.

2. The method of claim 1 wherein said step of decoding includes: recording the detected segments of the program information at a relatively high recording speed; and reproducing the recorded segments of the program information at a relatively low playback speed.

3. In a communication system through which a plurality of subscriber stations are linked by telephone network with a common service station at which a plurality of video/audio signal sources are located for transmission of continuous program information, in response to telephone dialed selection signals to the subscriber stations through a common signal carrier path independent of the telephone network, a signal transmission method including the steps of: processing the information sequentially readout at the service station for broadcast during predetermined transmission periods; detecting time-spaced segments of the broadcast program information at each of the subscriber stations corresponding to the selection signals originating therefrom; and sequentially decoding the detected segments of the broadcast program information for real time reproduction thereof at the subscriber stations, including the steps of: storing additional information at the service station corresponding to the segments of the broadcast program information; selecting the additional information in response to reception of said selection signals; inserting the selected additional information during during program spacing intervals between the segments of the broadcast program information for broadcast to the subscriber stations in advance to said segments of the broadcast information, said step of decoding including: recording the detected segments of the program information at a relatively high recording speed; and reproducing the recorded segments of the program information at a relatively low playback speed.

4. In a communication system through which a plurality of subscriber stations are linked by a telephone network with a common service station at which a plurality of video/audio signal sources are located for broadcast of selected program information to the subscriber station in response to telephone dialed selection signals therefrom, the improvement comprising the steps of: broadcasting time-spaced segments of a program signal in sequence during a predetermined transmission period; detecting said segments of the program signal at the subscriber stations in sequence for real time reproduction of the selected program information, establishing spacing intervals between the segments broadcast during the transmission period; inserting selected signals during said spacing intervals; detecting said selected signals at the subscriber stations immediately preceding said detection of the segments of the program signal; registering said insertion of the selected signals; and selectively cancelling said registration prior to termination of the spacing intervals.

5. In a communication system having a plurality of subscriber stations at which signal receivers are located for reception of broadcast signals from a broadcast transmitter at a remote location through a signal carrier network and a telephone network through which dialed telephone links are established between the subscriber stations and said remote location, the improvement comprising a library of recorded program material at the remote location, signal processing means operatively connecting the library to the broadcast transmitter for transmission of said program material through the signal carrier network, selection control means at the subscriber stations for transmitting program selection signals through the dialed telephone links to said remote location and controlling reception of the transmitted program material by the signal receivers, means for inserting additional signals to the program material supplied by the signal processing means to the broadcast transmitter in response to reception of the selection signals transmitted through the dialed telephone links, means enabled by the transmitted selection signals during intervals preceding transmission of the program material for registering said insertion of the additional signals and means at the subscriber stations for selectively cancelling said registration of the additional signals in response to commands generated prior to termination of said intervals.

* * * * *